3,145,236
   PROCESS FOR PREPARATION OF VINYL
                 CHLORIDE
Pierre Jean Leroux and Frederic Francois Albert Bra-
   conier, Brussels, Belgium, assignors to Societe Belge
   de l'Azote et des Produits Chimiques du Marly, Liege,
   Belgium
   No Drawing. Filed Oct. 25, 1960, Ser. No. 64,707
Claims priority, application Great Britain Oct. 28, 1959
             12 Claims. (Cl. 260—656)

This invention relates to the preparation of vinyl chloride and, more particularly, to the catalytic synthesis of vinyl chloride by selective chlorination of ethylene in gaseous mixtures containing ethylene admixed with and diluted by other components and in a manner to provide enhanced yield of vinyl chloride and improved operational economy and efficiency.

If it is attempted to produce vinyl chloride by the direct chlorination of ethylene, it may be found that, with or without the use of catalysts such as antimony chloride or tin chloride or carbon, a reaction temperature of at least 300° C. or, perhaps, 400° C., may have to be maintained for achieving adequate yields of product. If the ethylene being treated, particularly at higher temperatures, is diluted or admixed with other materials which may react with chlorine, or which may polymerize or adversely affect the reaction at such temperatures, it may be found that an inadequate yield of vinyl chloride is obtained, or other operating difficulties may be encountered affecting either the efficiency or economy of the process, particularly when considered in commercial or industrial scale quantities.

If one is particularly interested in the direct synthesis of vinyl chloride from catalytic chlorination thereof in commercial quantities and utilizing as a source of ethylene that produced as part of a mixture of gaseous hydrocarbons formed by pyrolysis decomposition of hydrocarbons, it may be found that such gaseous admixture resulting from such a pyrolysis reaction contains, in addition to the ethylene desired, other components (such as highly reactive acetylene, saturated hydrocarbons, hydrogen, carbon monoxide, nitrogen, etc.) the presence or reactivity of which may be inimical to the optimum efficiency or production of vinyl chloride as desired. Even considering gaseous mixtures which contain substantially no unsaturated carbons other than ethylene, the direct chlorination of the ethylene component to dichlorethane, the separation thereof and pyrolysis to vinyl chloride, and, perhaps, the chlorination-oxidation of other components of the mixture may still be found, when considered on industrial scale quantities, to provide less than optimum efficiency or economies and/or a complexity of processing steps more than is desired.

According to this invention, by contrast, there is provided for the direct chlorination of ethylene contained in gaseous mixtures and diluted with other gaseous components forming directly vinyl chloride and under conditions substantially avoiding undesired chlorination of others of the gaseous components; and, as a further feature of this invention, when the original gaseous mixture also contains acetylene, this material is first hydrochlorinated to vinyl chloride, using hydrochloride acid formed by this process, and removed prior to the chlorination of the ethylene so as to increase the yield of vinyl chloride while avoiding disadvantageous conditions which the presence of unreacted acetylene might introduce into the ethylene chlorination step in accordance herewith.

The foregoing and other objects of this invention will be apparent from the following description and the appended claims, and with particular reference to preparing vinyl chloride from gaseous mixtures containing ethylene diluted with other gaseous components in a reduced number of operating steps and under operating conditions giving a high conversion rate of ethylene (and/or other components in the starting mixture) into vinyl chloride by direct catalytic chlorination of the hydrocarbons while substantially avoiding undesired chlorination or other contaminating reaction or other components in the original gaseous mixture.

As noted, the teachings of this invention may be advantageously employed for utilizing directly the gaseous mixtures produced by the pyrolysis or partial decomposition of hydrocarbons and including mixtures of ethylene with other gaseous substances such as methane, hydrogen, carbon monoxide, acetylene, etc. Although, as will be understood, the teachings hereof are not to be considered as limited to utilizing such starting materials, the advantages and efficiency and economy of this invention may be particularly noticeable with such materials, as well as by comparison with attempts to produce vinyl chloride by high temperature chlorination of ethylene to dichlorethane and the subsequent pyrolysis thereof into vinyl chloride and hydrogen chloride.

Generally, the treatment of ethylene-containing gaseous mixtures in accordance herewith includes passing the gaseous mixture and chlorine gas together over a catalyst comprising activated carbon which has been impregnated with at least about 5% by weight, and preferably 10% to 25%, of calcium chloride and/or strontium chloride at temperatures ranging from about 275° to 375° C., and preferably 300° to 325° C., at space velocities of about 20 to 30 litres of the mixture of chlorine gas and the gaseous mixture to be treated per litre of catalyst per hour and under a pressure of at least about atmospheric or somewhat above. Preferably, the molecular ratio of ethylene in the mixture to be treated to chlorine gas is kept at about a value of 1.

As will be understood, such catalytic treatment produces a direct and substantially one-step chlorination of ethylene in the reaction mixture to vinyl chloride with the concomitant production of hydrogen chloride at a theoretical molecular stoichometric ratio of unity, but under conditions where, as noted below, undesired polymerizations and undesired chlorination of other components in the gaseous mixture are avoided and notwithstanding the fact that such other components may be susceptible to direct reaction with chlorine gas. If the starting mixture contains acetylene, as frequently may be the case when the starting material is a gaseous mixture from a pyrolysis reaction of hydrocarbons to form a mixture of ethylene and acetylene, it may be found that acetylene may polymerize upon and inhibit the efficiency of the catalyst even at the relatively low chlorination temperatures utilized. In such cases, it is preferred to provide for a preliminary removal of acetylene from the gaseous mixture before the chlorination of ethylene therein. It is also preferred that such preliminary removal of acetylene, in accordance herewith, include the direct catalytic hydrochlorination of acetylene, as described below, with hydrogen chloride (preferably that produced from the chlorination of ethylene) to vinyl chloride and as a desirable means of advantageously increasing the yield of vinyl chloride, increasing the efficiency of chlorine utilization, and increasing the overall efficiency of the ethylene chlorination by preliminary but useful removal of acetylene present in the starting mixture to be treated.

Purely as illustrative of some of the advantages and operating techniques and processes embodying and for practising this invention, a quantity of comparative data is set forth below with regard to various runs in accordance hereof. These data were accumulated from a variety of runs under different conditions and conducted in a catalytic reaction furnace having a length of 56 cm. and an internal diameter of 4.5 cm., the furnace being electrically heated to vary the internal temperature from about 200° to 500° C. In each case, the gaseous mixture containing ethylene was dried, in known manner by contact with potash, and the chlorine gas reactant was dried on silica gel. Both gaseous streams were then mixed and introduced into the furnace, and the gaseous mixture leaving the furnace was passed through a water column and then through a soda column (to remove hydrochloric acid formed during the reaction) and the condensable portion of the resultant gaseous mixture was recovered by cooling down to about −65° C. The volume of the uncondensed gas was measured. The hydrocarbon gaseous mixture (both before and after the catalytic chlorination reaction) was analyzed, in known manner, by gaseous chromatography (using sterchamol impregnated with 30% of acetonylacetone as the stationary phase and hydrogen as the carrying gas) and the chlorinated derivatives in the resultant mixture were analyzed by infrared spectometry.

As illustrative of catalyst materials for the direct chlorination of ethylene in accordance herewith may be noted the preparation of catalysts (as satisfactorily used in the various runs as to which data is reported below) from 3 mm. granules of either de-ashed or un-de-ashed activated carbon. A typical analysis of the de-ashed carbon (having 3.20% ashes by weight) showed for the ash composition (by weight):

|  | Percent |
|---|---|
| $SiO_2$ | 2.45 |
| $Al_2O_3$ and $Fe_2O_3$ | 0.38 |
| CaO and MgO | 0.37 | and a typical analysis of the un-de-ashed activated carbon (having 8.72% by weight of ashes) showed an ash composition (by weight) of:

|  | Percent |
|---|---|
| $SiO_2$ | 2.95 |
| $Al_2O_3$ and $Fe_2O_3$ | 3.39 |
| CaO and MgO | 2.38 |

The activated carbon was dried in a drying oven for about 24 hours at about 120° C., and was then impregnated with a solution prepared by dissolving the selected catalytic salt (e.g., calcium chloride and/or strontium chloride) in distilled water at about 80° C. The activated carbon (still at a temperature of about 120° C.) was introduced into the salt solution and thereafter allowed to cool down to room temperature, the impregnation contact time extending over about 24 hours. The supernatant salt solution was then decanted, and the catalyst was dried for 24 hours at 120° C. under a nitrogen atmosphere.

The illustrative data reported below in Table I was accumulated from a series of runs in the above described catalytic reaction furnace utilizing, as a gaseous mixture to be treated, ethylene diluted with nitrogen to a composition of about 10% by volume of ethylene and 90% by volume of nitrogen—i.e., under operating conditions which were not complicated by the presence in the gaseous mixture to be treated of acetylene or gaseous hydrogen or other reactive components which might have an effect, as noted herein, on the efficiency of completeness of the direct chlorination reaction, and chlorine gas was admixed such ethylene-nitrogen mixture to obtain a molecular ratio, as between ethylene and chlorine, of approximately unity. The data from these runs are summarized in the following table.

*Table I*

| Run No. | Type of catalyst | Space velocity[1] | Temp., °C. | Conversion percent ethylene to $CH_2$—CHCl | Conversion percent chlorine to $CH_2$—CHCl |
|---|---|---|---|---|---|
| 1 | Nil [2] | 14 | 200 | 0 | 0 |
| 2 | Nil [2] | 14 | 300 | [3] | [3] |
| 3 | Nil [2] | 14 | 400 | 2 | 1 |
| 4 | Nil [2] | 14 | 500 | 4 | 2 |
| 5 | Activated carbon | 14 | 200 | 5 | 2 |
| 6 | Activated carbon | 14 | 300 | 33 | 16 |
| 7 | Activated carbon | 14 | 400 | 13 | 7 |
| 8 | Granular $CaCl_2$, 100% | 25 | 250 | 24 | 11 |
| 9 | Granular $CaCl_2$, 100% | 25 | 300 | 38 | 18 |
| 10 | Granular $CaCl_2$, 100% | 25 | 350 | 20 | 9 |
| 11 | Activated carbon with 5% $CaCl_2$ | 25 | 300 | 43 | 21 |
| 12 | Activated carbon with 10% of $CaCl_2$ | 25 | 200 | 72 | 39 |
| 13 | Activated carbon with 10% of $CaCl_2$ | 25 | 300 | 78 | 40 |
| 14 | Activated carbon with 10% of $CaCl_2$ | 25 | 300 | 81 | 40.5 |
| 15 | Activated carbon with 10% of $CaCl_2$ | 25 | 300 | 78 | 38 |
| 16 | Activated carbon with 10% of $CaCl_2$ | 50 | 300 | 58 | 27 |
| 17 | Activated carbon with 20% $CaCl_2$ | 14 | 250 | 52 | 25 |
| 18 | Activated carbon with 20% $CaCl_2$ | 14 | 300 | 75 | 38 |
| 19 | Activated carbon with 20% $CaCl_2$ | 25 | 250 | 48 | 22 |
| 20 | Activated carbon with 20% $CaCl_2$ | 25 | 300 | 77 | 38 |
| 21 | Activated carbon with 20% $CaCl_2$ | 25 | 325 | 76 | 33 |
| 22 | Activated carbon with 20% $CaCl_2$ | 25 | 350 | 59 | 29 |
| 23 | Activated carbon with 20% $SrCl_2$ | 14 | 200 | 36 | 16 |
| 24 | Activated carbon with 20% $SrCl_2$ | 25 | 200 | 22 | 10 |
| 25 | Activated carbon with 20% $SrCl_2$ | 25 | 250 | 45 | 22 |
| 26 | Activated carbon with 20% $SrCl_2$ | 25 | 300 | 65 | 30 |
| 27 | Activated carbon with 20% $SrCl_2$ | 25 | 350 | 70 | 34 |
| 28 | Activated carbon with 20% $SrCl_2$ | 25 | 375 | 51 | 27 |
| 29 | Activated carbon with 20% $SrCl_2$ | 50 | 300 | 55 | 21 |
| 30 | Activated carbon with 5% $CaCl_2$ and 5% $SrCl_2$ | 25 | 300 | 78.5 | 36.5 |
| 31 | Activated carbon with 5% $CaCl_2$ and 5% $SrCl_2$ | 25 | 300 | 77.5 | 37 |
| 32 | Activated carbon with 5% $CaCl_2$ and 5% $SrCl_2$ | 25 | 300 | 75 | 37 |

[1] Space velocity calculated as litre gaseous mixture per litre catalyst per hour for Run Nos. 5–32.
[2] Space velocity calculated as litre gaseous mixture per litre reaction space for Run Nos. 1–4 having no catalyst.
[3] Traces.

Consideration of the foregoing data shows that the yield of vinyl chloride is least with chlorination in the absence of a catalyst (Runs 1–4), and is also low when either activated carbon (Runs 5–7) or granular calcium chloride (Runs 8–10) is used alone and under the temperature and throughput velocities indicated. When, however, in accordance with this invention the catalyst includes activated carbon impregnated with either calcium chloride (Runs 11–12) or strontium chloride (Runs 23–29) or with a mixture thereof (Runs 30–32), the rate of direct conversion of ethylene into vinyl chloride in one step can be increased to as high as about 80% or more with proper adjustment of the various temperature and throughput velocity conditions. As will also be noted from the foregoing, the most preferred operating conditions include a temperature range of 300° to 325° C., a space velocity of about 25 litres of the chlorine-gaseous reaction mixture per litre of catalyst per hour, while using as the catalyst activated carbon impregnated with from 10% to 20% by weight of calcium chloride or strontium chloride or a mixture of calcium and strontium chlorides in equal proportions.

Also as indicated with the foregoing data, the space velocities or throughput velocities of the reaction mixture being treated exercise a pronounced effect on the ultimate yield and conversion of ethylene into vinyl chloride. For example, as the velocity increases above 25 litres of reaction mixture per litre of catalyst per hour, the conversion rate of the diluted ethylene into vinyl chloride decreases and the percentage of unconverted ethylene increases. This consideration is emphasized by the following summary of data noted in the following table as indicating such influence on throughput velocity to the desired efficiency:

*Table II*

| Run No. | Temp., °C. | Catalyst | Space velocity | Conversion percent ethylene to $CH_2=CHCl$ |
|---|---|---|---|---|
| 13, 15 | 300 | | 25 | 78 |
| 14 | 300 | Activated carbon with 10% $CaCl_2$. | 25 | 81 |
| 16 | 300 | | 50 | 58 |
| 33 | 300 | | 50 | 59 |

As noted before, ethylene mixtures to be treated in accordance herewith may contain materials which are, in addition to the ethylene, reactive to direct chlorination, although the chlorination of which is not desired. Satisfactory results have been achieved, nevertheless, in accordance with this invention by the treatment of such ethylene mixtures under the operating conditions and with the catalysts noted whereby chlorination of ancillary components of the mixture is avoided notwithstanding the fact that such materials may be, under other operating conditions of pressure, catalyst, etc., quite reactive with respect to gaseous chlorine. For example, gaseous mixtures containing, in addition to ethylene, such materials as carbon monoxide or hydrogen or methane are treated in accordance herewith satisfactorily for the chlorination of the ethylene but with a substantial absence of chlorinating reaction of the carbon monoxide or hydrogen or methane components. Apparently, then, the catalysts and/or operating conditions employed in accordance herewith not only promote the ready and efficient chlorination of the ethylene, but also seem to inhibit the undersired chlorination of carbon monoxide or hydrogen or methane, etc.

When, however, the original gaseous mixture to be treated also includes a signficant or substantial proportion of acetylene, as frequently may be the case when the mixture to be treated is produced from a pyrolysis reaction of hydrocarbons, it has been found that, during a chlorination reaction as above noted, acetylene components of the mixture being treated may have a tendency to polymerize on the catalyst to an undesired extent.

Consequently, when utilizing as a starting material a gaseous mixture obtained from the pyrolysis of hydrocarbons and/or otherwise including, in addition to ethylene, such materials as acetylene, etc., it is preferred preliminarily to remove acetylene components thereof prior to the direct chlorination of the ethylene components of the mixture. Thus, after drying the gaseous mixture (and after the normal removal, as well understood, of aromatic compounds and acetylene homologues), it is preferred, in accordance herewith, to treat such a mixture in two steps, instead of one, the first of which relates to the catalytic hydrochlorination of acetylene with hydrochloric acid, whereas the second relates to the catalytic chlorination of ethylene as described above with chlorine gas.

Thus, by a less drastic hydrochlorination of acetylene with hydrochloric acid (instead of chlorine gas), the acetylene can be converted into vinyl chloride, and prior to the chlorination of ethylene with chlorine gas. The overall efficiency of such a process, as will be understood, is enhanced if the hydrochloric acid used for the preliminary hydrochlorination and removal of acetylene is that which is produced as a by-product during the direct gaseous chlorination of ethylene.

As illustrative of such a first-step or preliminary acetylene hydrochlorination may be noted the synthesis of vinyl chloride from acetylene and hydrochloric acid, in known manner, in the presence of a catalyst such as mercuric chloride and at a temperature of about 140°–150° C. Under such circumstances, the remaining or non-acetylene components of the original gaseous mixture remain substantially unchanged and/or, at least, the catalytic treatment at such temperatures and with hydrochloric acid instead of chlorine gas do not appear to have a sufficiently drastic chlorination effect for the chlorination of either ethylene or other components in the mixture, although such a step does produce vinyl chloride by hydrochlorinating acetylene, as will be understood, an increased vinyl chloride yield from the whole system and an efficient utilization of hydrochloric acid subsequently produced in the direct gaseous chlorination of ethylene.

After such hydrochlorination of acetylene, as will be understood, the vinyl chloride is removed, in known manner, from the gaseous mixture, and the acetylene-free mixture is then subjected to the direct chlorination step mentioned above for the conversion of ethylene therein to vinyl chloride, and with the by-product production of hydrochloric acid which, as above noted, may be advantageously used for the first step of the production of vinyl chloride from acetylene. Since the hydrochloric acid produced during the ethylene chlorination step is desired to be removed from the resultant product in any case, it is convenient to remove this material, in accordance herewith, by dissolving in a solvent and stripping the acid from the dissolving solution by passing therethrough the original gaseous mixture including acetylene.

As illustrative of the advantages and operational factors achieved with the treatment in accordance herewith of an original gaseous mixture containing both acetylene and ethylene for conversion into vinyl chloride in the two-stage arrangement just described, the data set forth in Table III may be noted. Thus, a gaseous mixture obtained from the pyrolysis of saturated hydrocarbons was first dried and freed from aromatic compounds and acetylene homologues, and then was treated in accordance with the two-stage system noted to provide for, first the hydrochlorination of acetylene components therein with hydrochloric acid, and thereafter, the direct chlorination of ethylene components therein with gaseous chlorine, providing vinyl chloride and the hydrochloric acid utilized in the preliminary hydrochlorination of acetylene to convert that material to vinyl chlorides.

The data in the following Table III sets forth various analyses of the original gaseous mixture at different stages of the treatment in accordance herewith, with respect to the constituents, noted as follows:

(A) Analysis of the starting pyrolysis gaseous mixture.

(B) Analysis of the gaseous constituents after reaction of acetylene components therein with hydrochloric acid as above noted in the presence of mercuric chloride and after removal of the resulting vinyl chloride formed thereby.

(C) Analysis of the resulting gaseous constituents after reaction of the ethylene-containing gaseous mixture from (B) with chlorine in the presence of activated carbon impregnated with 10% calcium chloride at 300° C. and at a velocity of 25 litres of the chlorine-residual gas mixture per litre of catalyst per hour at a molecular ratio of ethylene to chlorine of approximately unity.

Table III

| Analysis of gaseous mixture | A (percent) | B (percent) | C (percent) |
|---|---|---|---|
| $C_2H_2$ | 10.2 | 0 | 0 |
| $C_2H_4$ | 8.3 | 8.8 | 1.0 |
| $H_2$ | 48.1 | 53.4 | 53.4 |
| $CH_4$ | 14.0 | 15.6 | 15.8 |
| $CO$ | 17.4 | 19.8 | 20.6 |
| $N_2$ | 2.0 | 2.4 | 2.6 |
| $CH_2=CHCl$ | | | 6.6 |

From the data set forth in Table III it will be understood that substantially all of the acetylene was converted into vinyl chloride upon reaction with hydrochloric acid under the conditions noted and preliminarily to subsequent treatment to the ethylene-containing gaseous mixture. Also, a high yield of about 78% of the original ethylene was satisfactorily converted into vinyl chloride upon the chlorination thereof with chlorine gas and the impregnated activated carbon. Furthermore, the hydrogen, methane, carbon monoxide, etc., originally present in the pyrolysis gas mixture did not react with either the hydrochloric acid agent or the gaseous chlorine utilized and under the operating conditions in accordance herewith.

As further illustrative of the influence molecular ratios of ethylene to chlorine and to the throughput velocities under various conditions or operation in accordance herewith, data relating to a number of Runs are summarized in Table IV, all of which runs related to a gaseous mixture of a composition of that in column B of Table III, which data may be summarized as follows:

Table IV

| Run No | 34 | 35 | 36 | 37 | 38 | 39 | 40 | 41 |
|---|---|---|---|---|---|---|---|---|
| Temp. (° C.) | 300 | 300 | 300 | 300 | 300 | 300 | 325 | 350 |
| Velocity | 25 | 25 | 25 | 25 | 50 | 50 | 50 | 50 |
| $C_2H_4/Cl_2$ | 0.8 | 0.86 | 1 | 1 | 0.9 | 0.9 | 1 | 1 |
| Percent ethylene converted to $CH_2=CHCl$ | 74 | 73.8 | 77 | 74 | 63 | 60 | 65 | 59 |
| Percent chlorine converted to $CH_2=CHCl$ | 30.4 | 32.6 | 38 | 36 | 31.4 | 29.5 | 31 | 29 |
| Unconverted CO | 100.4 | 100.5 | 100 | 101 | 99 | 100 | 100 | 101 |
| Unconverted methane | 100.5 | 99.7 | 100.5 | 100 | 101 | 101 | 100.5 | 100 |
| Unconverted hydrogen | 100 | 100 | 100 | 100 | 98 | 99 | 99 | 100 |

Consideration of the foregoing data will make apparent that, under the operating conditions herewith and when starting with the original gaseous mixture containing ethylene, methane, carbon monoxide, and hydrogen, the chlorine reacts preferentially with the ethylene to produce an achievable conversion rate of ethylene into vinyl chloride in the neighborhood of as high as 80%. The methane, carbon monoxide, and hydrogen, by contrast, do not appear to react with the chlorine under such circumstances, thus both increasing the efficiency of the process and minimizing the unwanted chlorination of other components and/or the contaminant production which might result therefrom. Preferably, the temperature is kept, satisfactorily, fairly close to 300° C., since a noticeable decrease in the conversion rate of ethylene into monomeric chloride is discernable as the temperature rises substantially above 325° C. Similarly, the space velocity or throughput of the gaseous reaction mixture is preferably maintained in the range of 25 to 30 litres of gaseous mixture (i.e., chlorine gas plus hydrocarbon reaction mixture) per litre of catalyst per hour, because substantially increasing such throughput velocities have been found to have a decreasing effect on optimum rates of ethylene conversion to vinyl chloride and in a manner which does not appear to be completely compensated for by an increase in reaction or catalyst temperature.

There is, thus, provided according to the invention here, an improved process for the direct chlorination of ethylene in a diluted gaseous mixture thereof, as well as a process for improved efficiency for the direct chlorination synthesis of vinyl chloride from mixtures of ethylene and acetylene and other gaseous components of widely varying susceptibilities to chlorination whereby acetylene components may be chlorinated to vinyl chloride in a first or direct hydrochlorination step utilizing hydrochloric acid at a relatively low chlorinating temperature, and, thereafter, ethylene components may be chlorinated to vinyl chloride with chloride gas at a relatively higher chlorination temperature and without either interference or substantial diminution of conversion rate as between more reactive acetylene components and ethylene components or undesired chlorination of other components of the gaseous mixture which would not produce vinyl chloride.

While the methods and products described herein constitute preferred embodiments of the invention, it is to be understood that the invention is not limited to these precise methods and products and that changes may be made therein without departing from the scope of the invention as defined in the accompanying claims.

What is claimed is:

1. In a process for producing vinyl chloride by direct and selective catalytic chlorination of ethylene in a gaseous mixture consisting essentially of a minor proportion of ethylene diluted and admixed with preponderantly larger proportions of hydrogen, methane, and carbon monoxide as components in said mixture also susceptible to reaction during said chlorination, the steps which comprise admixing chlorine gas with said gaseous mixture, passing the resulting admixture over and in contact with a chlorination catalyst selected from the group consisting of calcium chloride, strontium chloride, and mixtures thereof, effecting chlorination of said ethylene in said gaseous mixture to vinyl chloride while avoiding chlorination of said other gaseous components of said mixture, maintaining an elevated temperature during said chlorination reaction within the range of about 275° to 375° C. and maintaining the throughput velocity of said chlorine and ethylene-containing admixture within the range of about 14 to 50 liters of said admixture per liter of said catalyst per hour, and separating vinyl chloride thus formed from other gaseous components and products of said processes.

2. A process as recited in claim 1 in which said elevated temperature of said chlorination reaction is within the range of about 300° to 325° C.

3. A process as recited in claim 1 in which the molecular ratio of ethylene to chlorine in said admixture is maintained at approximately unity.

4. A process as recited in claim 1 in which the throughput velocity of said chlorine and ethylene-containing admixture is maintained within the range of about 20 to 30 litres of said admixture per litre of said catalyst per hour.

5. A process as recited in claim 1 in which said catalyst is impregnated into activated carbon as a carrier therefor, with at least about 5% by weight of said catalyst being present on said activated carbon.

6. A process as recited in claim 5 in which said catalyst is present on said activated carbon within the range of about 10% to 25% by weight.

7. In a process for producing vinyl chloride by direct and selective catalytic hydrochlorination and chlorination treatments of acetylene and ethylene in a gaseous mixture consisting essentially of minor proportions of acetylene and ethylene diluted and admixed with preponderantly larger portions of hydrogen, methane and carbon monoxide as components in said mixture also susceptible to reaction during said hydrochlorination and chlorination, the steps which comprise reacting said gaseous mixture with hydrogen chloride for converting said acetylene therein to vinyl chloride in a catalytic hydrochlorination step at an elevated temperature and substantially in the absence of reaction with said other components in said gaseous mixture, separating said vinyl chloride thus produced from other components of said hydrochlorination step, admixing chlorine gas with the remaining gaseous mixture from said hydrochlorination step, passing the resulting admixture over and in contact with a chlorination catalyst selected from the group consisting of calcium chloride, strontium chloride, and mixtures thereof, effecting chlorination of said ethylene in said gaseous mixture to vinyl chloride while avoiding chlorination of said other gaseous components of said mixture, maintaining an elevated temperature during said chlorination reaction within the range of about 275° to 375° C. and maintaining the throughput velocity of said chlorine and ethylene-containing admixture within the range of about 14 to 50 liters of said admixture per liter of said catalyst per hour, and separating vinyl chloride thus formed from other gaseous components and products of said processes.

8. A process as recited in claim 7 in which hydrogen chloride is also formed in said chlorination step and is re-cycled to said hydrochlorination step for providing said hydrogen chloride therein for said hydrochlorination of said acetylene.

9. A process as recited in claim 7 in which said catalytic hydrochlorination step for said acetylene is conducted in the presence of mercuric chloride as a catalyst.

10. A process as recited in claim 7 in which said hydrochlorination step for said acetylene is conducted at a temperature within the range of about 140° to 150° C.

11. A process as recited in claim 7 in which said elevated temperature during said chlorination step is within the range of about 300° to 325° C.

12. A process as recited in claim 7 in which the throughput velocity of said chlorine and ethylene-containing admixture in said chlorination step is maintained within the range of about 20 to 30 liters of said admixture per liter of said catalyst per hour.

References Cited in the file of this patent

UNITED STATES PATENTS

| | | |
|---|---|---|
| 2,167,927 | Groll et al. | Aug. 1, 1939 |
| 2,520,712 | Cheney | Aug. 29, 1950 |
| 2,822,410 | Wojcik et al. | Feb. 4, 1958 |

FOREIGN PATENTS

| | | |
|---|---|---|
| 603,099 | Great Britain | June 9, 1948 |